(12) United States Patent
Jarrett et al.

(10) Patent No.: US 6,819,430 B2
(45) Date of Patent: Nov. 16, 2004

(54) MANIFOLD FOR PROCESSING A STACKED ARRAY OF LASER BLOCK ASSEMBLIES

(75) Inventors: Mark J. Jarrett, St. Paul, MN (US); Edgar R. Mallison, Wayzata, MN (US)

(73) Assignee: Honeywell International, Inc., Morristown, NJ (US)

( * ) Notice: Subject to any disclaimer, the term of this patent is extended or adjusted under 35 U.S.C. 154(b) by 729 days.

(21) Appl. No.: 09/756,246

(22) Filed: Jan. 8, 2001

(65) Prior Publication Data

US 2003/0160962 A1 Aug. 28, 2003

(51) Int. Cl.$^7$ .............................................. G01C 19/64
(52) U.S. Cl. ...................................................... 356/459
(58) Field of Search ...................... 356/459, FOR 112; 372/94, 109; 445/73

(56) References Cited

U.S. PATENT DOCUMENTS

| | | | |
|---|---|---|---|
| 4,566,326 A | 1/1986 | Lowell | |
| 4,741,354 A | 5/1988 | DeMild, Jr. | |
| 4,971,189 A | 11/1990 | Fleming et al. | |
| 5,309,218 A | * 5/1994 | Laul | ............ 356/459 |
| 5,384,709 A | 1/1995 | Seder et al. | |
| 5,496,201 A | 3/1996 | Hwang | |

* cited by examiner

Primary Examiner—Samuel A. Turner
(74) Attorney, Agent, or Firm—Honeywell International, Inc.

(57) ABSTRACT

A manifold for providing the simultaneous processing of a plurality of laser block assemblies. In one embodiment, the manifold includes a hollow passage formed along the length of the manifold, and a plurality of passages extending between the hollow chamber and the exterior of the manifold. A laser block assembly is mounted to each of the plurality of passages of manifold. The assemblies can be arranged in a flat or parallel spaced arrangement relative to each other, and are mounted to the manifold with a fitting that is adapted to be easily severed after processing of the assemblies is completed. The manifold is mounted to a station of a processing tool, and a plurality of processing applications are performed on the plurality of laser block assemblies in a simultaneous fashion.

14 Claims, 6 Drawing Sheets

FIG. 1

PRIOR ART

MANIFOLD FOR PROCESSING A STACKED ARRAY OF LASER BLOCK ASSEMBLIES

TECHNICAL FIELD

The present invention is related to a laser block assembly. More specifically, the invention is a manifold for the simultaneous processing of a plurality of laser block assemblies in a stacked array.

BACKGROUND OF THE INVENTION

Ring laser angular rate sensors, commonly referred to as laser block assemblies, are well known and in widespread use today. For example, laser block assemblies are frequently used in guidance and navigation modules on a variety of vehicles, including airplanes, unmanned rockets, and military tanks. In addition, laser block assemblies are used in down-hole drilling operations, such as for oil, for providing precise locations of a drilling bit.

A typical laser block assembly includes a laser block having a plurality of interconnected passages formed within the block. The passages are arranged in a closed loop polygon shape with reflective surfaces positioned at the intersection of each passage, and a lasing gas, such as helium-neon for example, is contained within the closed loop path. Three electrodes are typically mounted to the laser block in fluid communication with the lasing gas in the closed loop path. The three electrodes can be configured as either an anode or a cathode, with either one cathode and multiple anodes or one anode and multiple cathodes. An electrical potential is created across each cathode and anode through the lasing gas to generate a pair of counter-rotating lasers that traverse the optical closed loop path of the laser block. The laser block assembly further includes a sensor array that measures minute deflections in the rotating lasers to provide precise measurements of the device on which the laser block assembly is mounted.

Because of the small deflections being measured by laser block assembly, it is important for the laser block assembly to be free of contaminants. That is, impurities and other contaminants in the laser block assembly of the laser block assembly can migrate into the closed loop path of the laser block. These impurities can contaminate the lasing gas, which adversely impacts the performance of the laser block assembly. Impurities can also have a negative effect on the reflective surfaces of the laser block assembly, which again impacts the performance of the gyro.

To prevent such contamination, the laser block assembly undergoes a series of processing steps to remove impurities in various assembly pieces prior to filling the laser block with the lasing gas. Typically, a single individual laser block assembly is attached to a station of a processing tool in such a manner that the closed loop path is fluidly coupled to the tool. The laser block assembly is then processed in accordance with known techniques, so as to, for example, remove contaminants in the laser block, and the closed loop path is then filled with a lasing gas. An individual processing tool may contain a number of processing stations, with a single laser block assembly connected to each individual processing station. Once processing is completed, the laser block assembly is removed from the processing station, and can be further processed to complete the manufacture of the laser block assembly.

The use of such conventional processing tools to process individual laser block assemblies can be inefficient. For example, because each processing station is capable of only operating on a single laser block assembly at a time, part through-put is limited.

There is thus a continuing need for an improved apparatus for processing a laser block assembly. An apparatus that permits a plurality of laser block assemblies to be processed simultaneously would be desirable to increase part through-put, as would an apparatus that is compatible with cluster tool environment technology.

SUMMARY OF THE INVENTION

The present invention is an apparatus for simultaneously processing a plurality of laser block assembly components that overcomes the shortcomings of conventional processing tools.

In one embodiment, the present invention is a manifold in combination with a plurality of laser block assemblies for processing a stacked array of laser block assemblies. The manifold includes an elongated member having a port that is coupled to a hollow chamber. The hollow chamber extends along at least a portion of the elongated member, and includes a plurality of passages that extend between the hollow chamber and the exterior of the elongated member. A plurality of laser block assemblies are mounted to the elongated member in communication with the hollow chamber, with each one of the plurality of laser block assemblies preferably mounted to one of the plurality of passages extending between the hollow chamber and the exterior of the elongated member. Each laser block assembly component can be mounted to the elongated member with a seal. The seal can comprise a first tube that is mounted to the passage of the elongated member and a fill tube that is mounted to the first tube with a connector. The first tube can be an isolation tube formed from a non-conductive material, such as glass or ceramic.

DETAILED DESCRIPTION OF THE PREFERRED EMBODIMENTS

Figure 1:
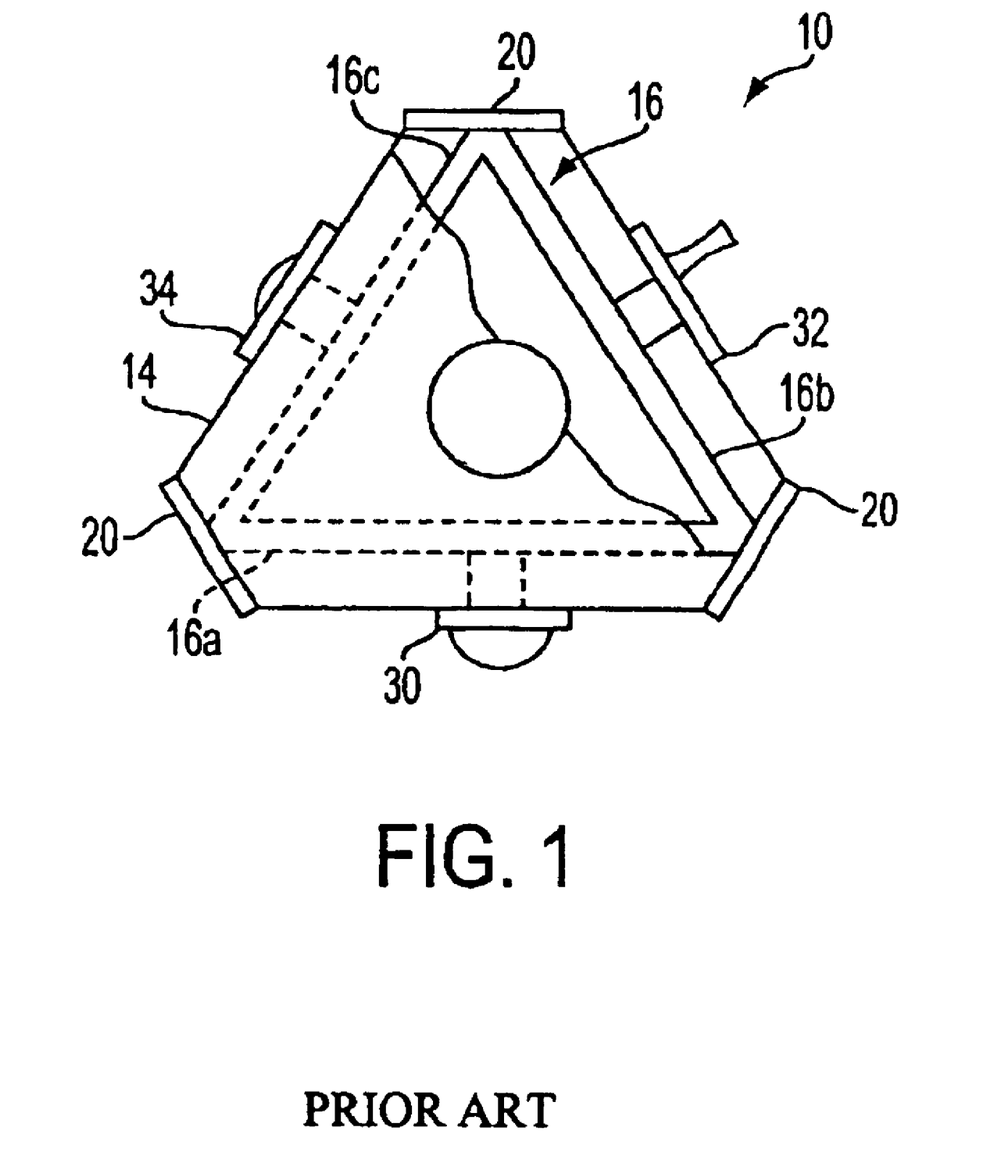
FIG. 1 is a plan view of a laser block assembly shown partially in section to illustrate the closed loop optical path of the laser block.
Figure 2:
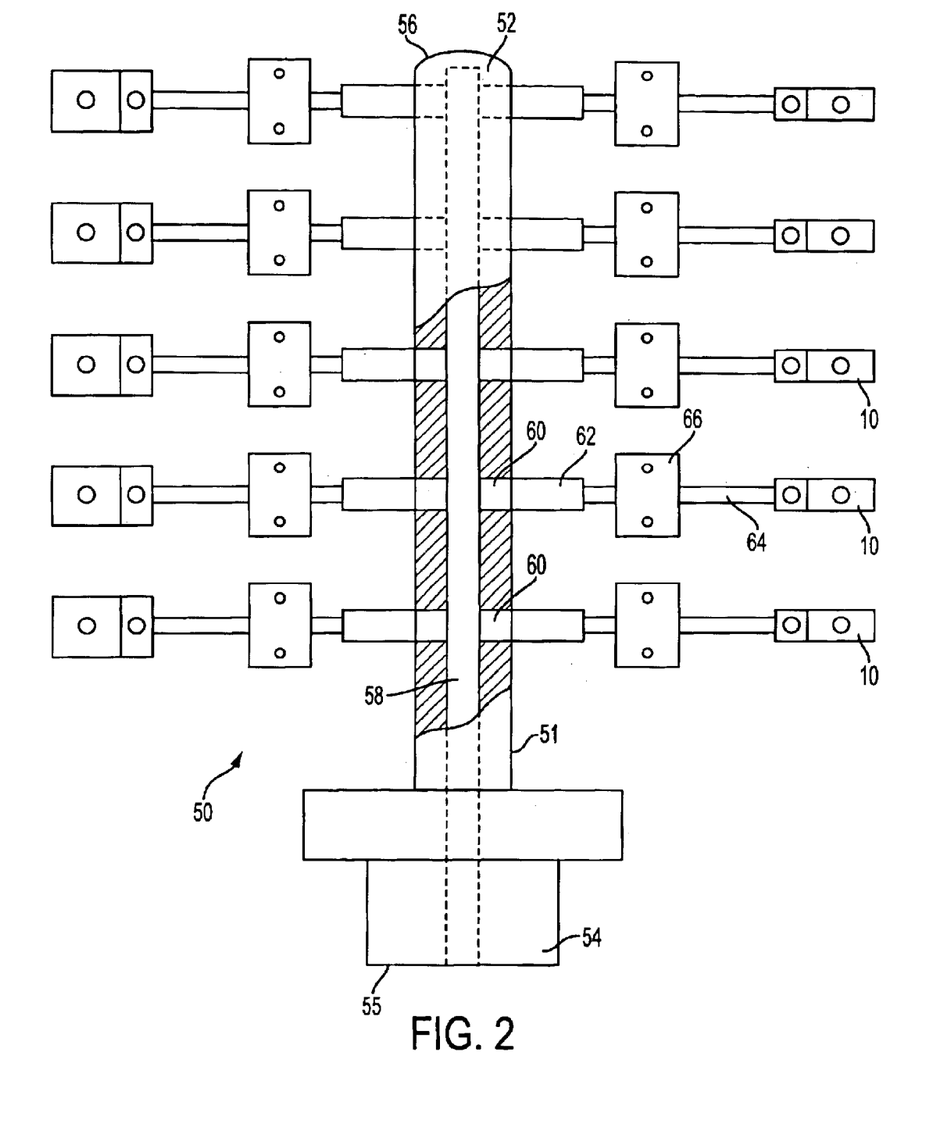
FIG. 2 is a plan view of a manifold in accordance with the present invention having a plurality of laser block assemblies fluidly connected to the manifold, the manifold shown partially in section to illustrate the fluid connections between the manifold and the laser block assemblies.
Figure 3:
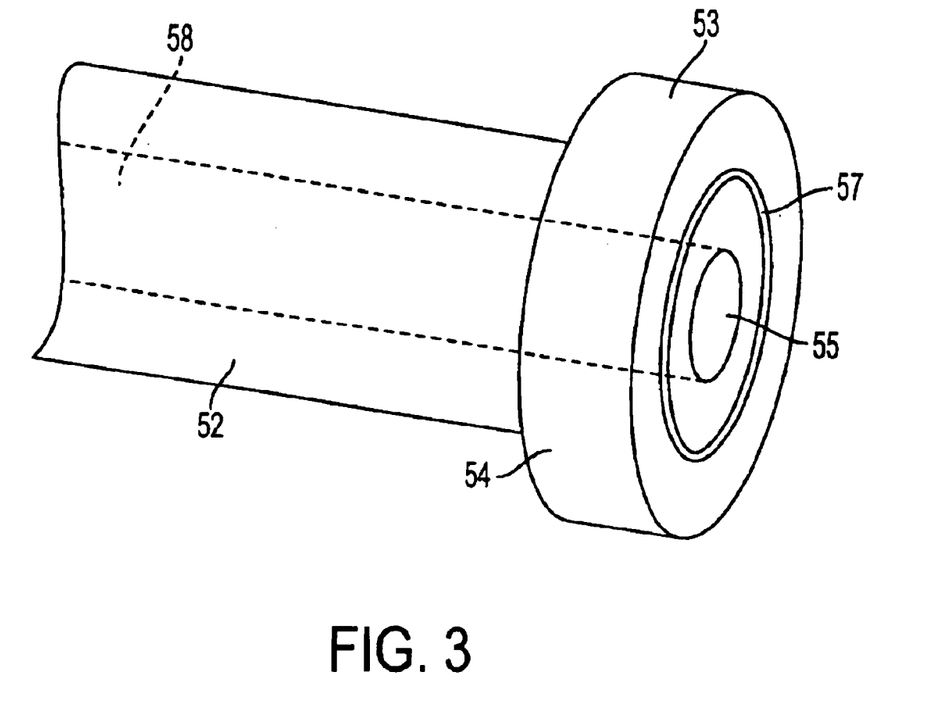
FIG. 3 is an isometric view of a portion of the manifold of FIG. 1 showing the fluid port of the manifold.

With reference to FIGS. 2-3, a manifold 50 in accordance with the present invention is shown having a plurality of laser block assemblies 10 attached along a length of manifold 50. A representative laser block assembly 10 which can be processed using the manifold 50 is shown in greater detail in FIG. 1. However, it is to be understood that other types of laser block assemblies can also be processed using manifolds 50 in accordance with the invention. Laser block assembly 10 includes a laser block 14 having an optical closed loop pathway 16 comprising a plurality of interconnected passages 16a, 16b, and 16c (shown partially in phantom). Reflective surfaces, such as mirrors 20, are positioned and appropriately angled at the intersection of the individual passages 16a, 16b, and 16c to reflect light from one passage into another passage. Excitation electrodes 30, 32, and 34 are mounted to laser block 14 in fluid communication with the closed loop path 16. Closed loop passage 16 is filled with a lasing gas, such as a mixture of helium and neon, through one of the electrodes appropriately fitted with a fluid port.

In forming a ring laser gyro from laser block assembly 10, electrodes 30, 32, and 34 are connected to a source of electrical potential (not shown), with excitation electrode 30 being connected to the negative terminal of the source of electrical potential (to function as a cathode) and excitation electrodes 32 and 34 being connected to the positive terminal of the source of electrical potential (to act as anodes). An electrical potential is placed across the cathode 30 and the anodes 32 and 34 through the lasing gas, which electrically charges the lasing gas to generate a pair of counter-rotating lasers. A sensor array (not shown) is also added in forming a ring laser gyro from laser block assembly 10 to measure the angular rate experienced by the laser block assembly 10 as a function of the deflection of the lasers.

To ensure the proper operation of a ring laser gyro that includes laser block assembly 10, the laser block assembly 10 undergoes a series of processing steps. For example, laser block 14 is typically formed from a dielectric material, such as glass or glass-ceramic, having a relatively low coefficient of thermal expansion. It is typically necessary to cleanse the laser block 14 of contaminants or otherwise process the laser block assembly 10 prior to filling closed loop path 16 with a lasing gas. Such processing steps often include the use of a variety of processing fluids, including gases and or liquids, applied under a variety of atmospheric conditions, including full or partial vacuum.

Typically, in performing the various processing steps on a laser block assembly, only a single laser block assembly 10 is processed at a time on a station of a processing tool. That is, an individual laser block assembly is mounted to an individual station of a tool capable of performing one or more processing steps. In such a processing tool, a number of sequential processing steps are performed on the laser block assembly while mounted to the processing tool. After the desired processing steps are carried out, the laser block assembly is removed from the processing tool, and the next laser block assembly is mounted on the processing tool and processed as desired. Such an approach is inefficient, however, since the overall cycle time for an individual laser block assembly is increased due to the time required to mount and dismount each individual laser block assembly.

As shown in FIGS. 2 and 3, the present invention overcomes such a shortcoming in that manifold 50 permits the simultaneous processing of a plurality of laser block assemblies 10 on one tool station. Manifold 50 includes an elongated tube 52 having first end 54 and a sealed second end 56. Elongated tube 52 includes a fluid port 55, which in the embodiment shown is positioned at first end 54 of tube 52, and a hollow chamber 58 (shown partially in phantom) that extends from the fluid port 55 along at least a portion of the tube 52 to sealed second end 56. As is described in more detail below, the fluid port 55 of elongated tube 52 includes a seal 53 that mates with a processing tool 70 (shown in FIG. 6) to receive one or more processing fluids into the hollow chamber 58 of elongated tube 52.

While in the embodiment of FIG. 2 hollow chamber 58 is shown extending substantially along the length of the elongated tube 52, it can alternatively extend along only a portion of the tube 52. In addition, while the fluid port 55 is shown positioned at first end 54 of tube 52, the fluid port 55 can be positioned at any point along the length of tube 52 extending between hollow chamber 58 and an exterior surface 51. Fluid port 55 can be mated with processing tool 70 to fluidly couple the hollow chamber 58 with the tool to receive processing fluids into the hollow chamber 58 of tube 52.

To provide the one or more processing fluids to the laser block assemblies 10 mounted to manifold 50, manifold 50 further includes a plurality of passages 60 that are formed in tube 52. More specifically, the plurality of passages 60 are fluidly connected to hollow chamber 58, and extend between hollow chamber 58 and exterior surface 51 of tube 52. The plurality of laser block assemblies 10 mounted to the manifold 50 are each individually sealed to one of the plurality of passages 60. That is, an individual one of the laser block assemblies 10 is fluidly sealed to an individual one of the plurality of passages 60, and in this manner, a stacked array of laser block assemblies 10 is provided on manifold 50. A processing fluid can be introduced into hollow chamber 58, through the fluid port 55 of tube 52, through the individual passages 60, and to the individual laser block assemblies 10 as may be required for a specific application.

Figure 6:
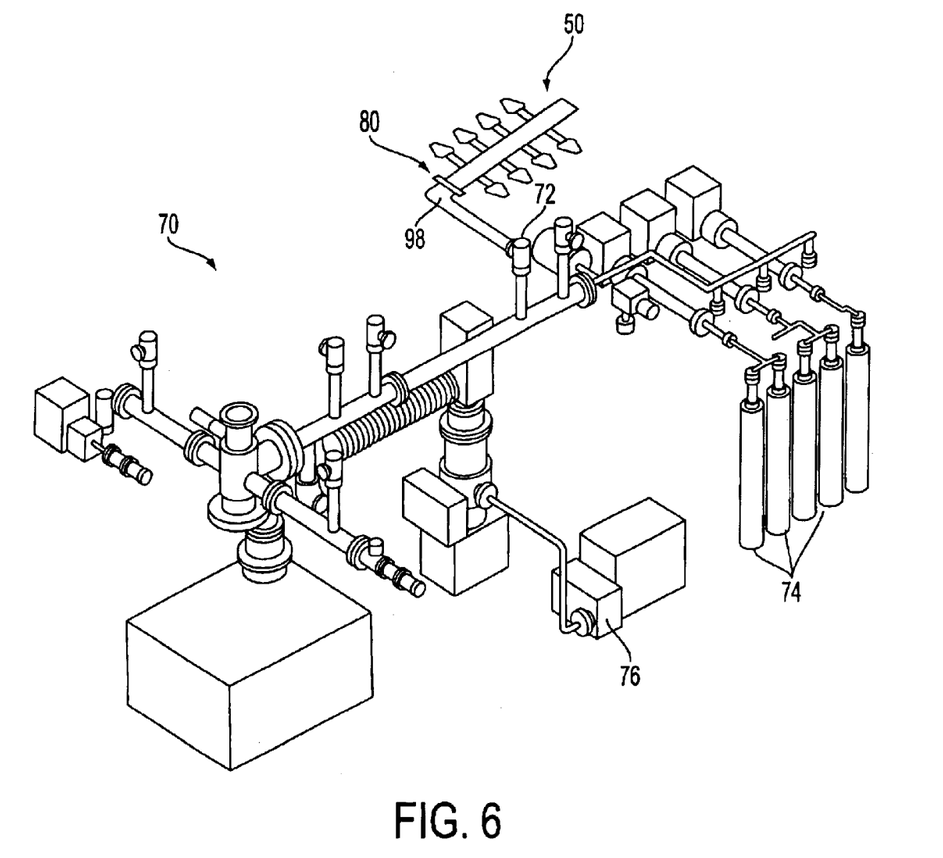
FIG. 6 is a schematic view of a processing tool including a manifold in accordance with the present invention.

Toward this end, manifold 50 is mounted to a station 72 on a processing tool 70, such as is shown in FIG. 6. Fluid port 55 of manifold 50 is provided with a seal 53 that mates with a corresponding fluid port 78 at station 72 on processing tool 70. Processing tool 70 is fluidly coupled to one or more reservoirs 74 of processing fluid, and processing fluid can then be introduced into manifold 50 through fluid port 55. Processing tool 70 can further include one or more vacuum pumps 76 (one is shown in the illustrated embodiment) capable of drawing full or partial vacuum across manifold 50, as may be desired for a specific processing application.

The processing fluid is introduced through fluid port 78 of tool 70 and into manifold 50 through port 55. The processing fluid traverses the hollow chamber 58 and the passages 60, and ultimately flows into the plurality of laser block assemblies 10. In this manner, a plurality of laser block assemblies 10 are processed simultaneously, which can increase both individual cycle time and the overall efficiency of processing a batch of laser block assemblies.

As mentioned above, each laser block assembly 10 is fluidly sealed to one of the plurality of passages 60 of elongated tube 52. To ensure the proper processing of each of the plurality of laser block assemblies 10, the seal between one or more laser block assemblies 10 and elongated tube 52 can include additional structure. That is, while the laser block assemblies can be sealed directly to the passages of the manifold by mounting a fluid port of an electrode of the laser block assembly to a passage of the manifold using a conventional seal, such as a weld or glass frit, in the embodiment of FIG. 2, the seal between each laser block assembly 10 and manifold 50 includes a first tube 62 and a fill tube 64. First tube 62 is mounted to an individual passage 60 of elongated tube 52, and fill tube 64 is fluidly coupled at one end to first tube 62 with a connector 66. Fill tube 64 is also fluidly coupled at its other end to laser block assembly 10, such as through a fluid port of one of the assembly electrodes. First tube 62 is mounted in fluid communication to passage 60 of elongated tube 52 using conventional means, such as by welding.

Connector 66 between first tube 62 and fill tube 64 can be of conventional design, such as a weld between the tubes.

Alternatively, and as shown in the embodiment of FIG. 2, connector 66 can be a compression seal fitted over the ends of first tube 62 and fill tube 64 to form a fluid-tight sealing engagement between the tubes. An RHP fitting, such as that commercially available from Flowmeca of Lisses, France, has been found to be suitable for connector 66. A compression fitting such as an RHP fitting advantageously permits second tube 64 to be removed from the manifold 50 after the laser block assembly mounted to tube 64 has been processed.

The additional structure of manifold 50 between elongated tube 52 and each laser block assembly 10, and specifically the materials chosen for first tube 62 and fill tube 64, can be adapted as desired for a particular processing step or sequence of processing steps. For example, first tube 62 and second tube 64 can each be formed from stainless steel for conventional gas processing applications. Alternatively, for processing applications involving a charged processing fluid, such as a plasma, first tube 62 can advantageously be formed from a glass, ceramic, or other non-conductive material such as 7052 glass available from Corning Glass Works. In such an embodiment, the first tube 62 serves as an isolation tube that prevents an electrical charge from being built up during the processing application and fed back to manifold 50, and ultimately to the processing tool 70 to which manifold 50 is mounted. In such an embodiment, the isolation tube can be fitted with a metal screen on the interior of the tube to prevent the charged processing fluid discharging to tool 70.

Alternatively, first tube 62 can be formed from stainless steel or other material, and an additional, separate isolation tube formed from a non-conductive material can be interposed between second tube 62 and the fill tube 64. In such an embodiment, the isolation tube can be sealed to first tube 62 and fill tube 64 with a conventional seal, such as a weld, adhesive, or a compression fitting.

As mentioned above, fluid port 55 is formed at first end 54 of tube 51, and includes a seal 53 that is adapted to be mated to fluid port 78 of processing tool 70 to receive a flow of processing fluid into manifold 50 through port 55. As shown in more detail in FIG. 3, a preferred seal 53 comprises a knife edge flange seal having an annular copper gasket 57 that surrounds the opening of fluid port 55 into hollow chamber 58. Knife edge flange seals are commercially available from companies such as Varian Associates of Lexington, Mass. The copper gasket 57 engages and seals with a mating surface 80 of port 78 of the processing tool 70 to provide a fluid-tight seal between manifold 50 and the processing tool 70. This fluid-tight seal permits a vacuum to be drawn across the manifold 50 if desired for a particular processing application, and ensures that processing fluid is dispensed into manifold 50 without loss to the surrounding environment of processing tool 70.

In the embodiment of FIG. 2, manifold 50 includes passages 60 that extend in opposing directions from hollow chamber 58. That is, the passages 60 are spaced along the length of manifold and extend perpendicular to the hollow chamber 58 on opposite sides of the elongated tube 52. In this manner, a symmetric stacked array of laser block assemblies 10 are mounted to the manifold 50. The spacing between passages 60, and thus between the individual laser block assemblies 10, can be optimized for different sized laser block assemblies. In the embodiment of FIG. 2, the assemblies 10 are each spaced apart and arranged to lie substantially in a plane that is transverse to the longitudinal axis of the elongated tube 52. That is, the laser block assemblies are arranged so that the thickness of each of the assemblies extends in a direction parallel to the longitudinal axis of the elongated tube 52. Such an arrangement advantageously permits a more dense stacked array to be provided along the length of the elongated tube 52.

Figure 4:
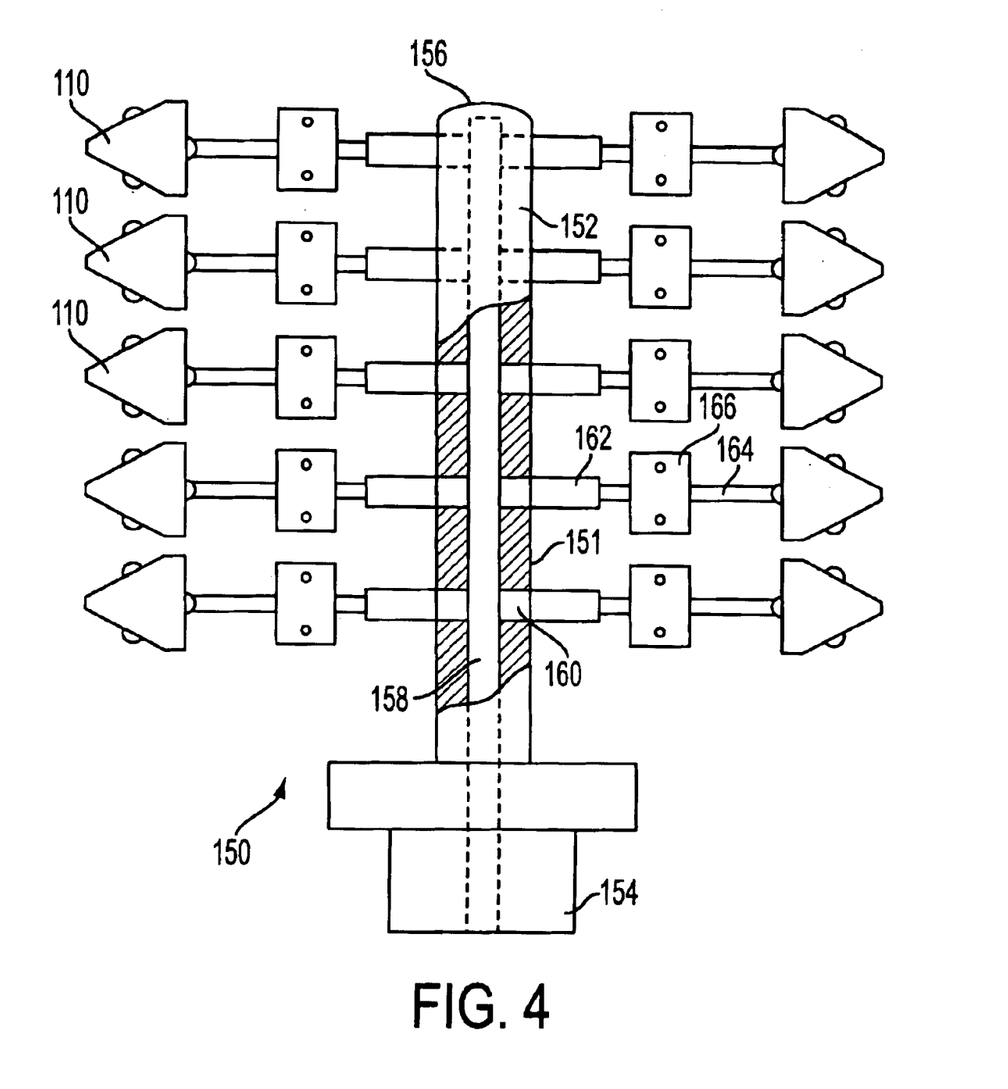
FIG. 4 is a plan view of a second embodiment of a manifold in accordance with the present invention.
Figure 5:
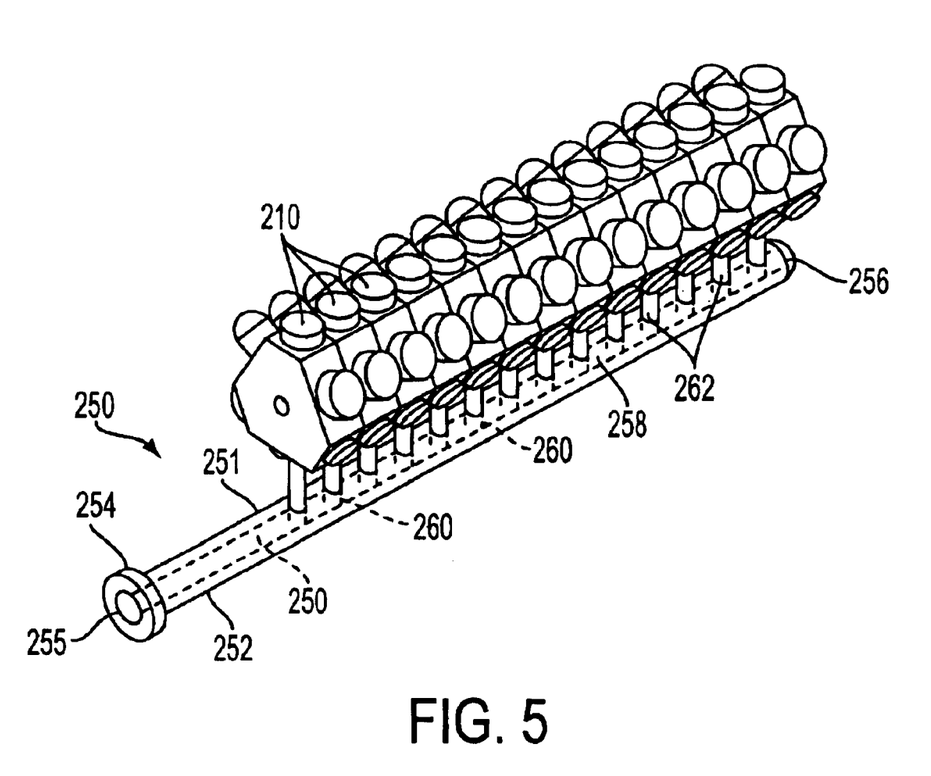
FIG. 5 is an isometric view of a third embodiment of a manifold in accordance with the present invention.

Laser block assemblies can also be mounted to a manifold in other configurations if desired, and FIGS. 4 and 5 show two alternative configurations for a manifold adapted to accommodate alternative array configurations. In the embodiment of FIG. 4, a portion of a manifold 150 having a plurality of laser block assemblies 110 is shown. The manifold 150 comprises the same structural components as are shown in FIG. 2 and described above, including an elongated tube 152 having a fluid port 155 at a first end 154 and a sealed second end 156; a hollow chamber 158 (shown in phantom) that extends between the fluid port and the second end 156; and a plurality of passages 160 (shown in phantom) that extend in opposite directions from hollow chamber 158 to exterior 151 of tube 152. A first tube 162 and a fill tube 164 extend from each passage 160, with a connector 166 sealing second tube 164 to first tube 162. First tube 162 and second tube 164 fluidly interconnect a laser block assembly 110 with the manifold 150. Each laser block assembly 110, however, is arranged on the manifold 150 in such a manner that the transverse width of the assembly 110 lies in a plane that is parallel to the longitudinal axis of elongated tube 152. Such a configuration of a manifold 150 and laser block assemblies 110 will provide a less dense array of assemblies as compared to the manifold 50/assembly 10 configuration shown in FIG. 2, but advantageously can be used on a processing stations having a reduced height because the laser block assemblies all lie substantially in a plane parallel to the longitudinal axis of elongated tube 152.

FIG. 5 shows a third embodiment of a manifold 250 in accordance with the present invention. Manifold 250 comprises many of the same structural components as are shown in FIG. 2 and described above, including an elongated tube 252 having a fluid port at a first end 254 and a sealed second end 256; a hollow chamber 258 (shown in phantom) that extends between the fluid port and the second end 256; and a plurality of passages 260 (shown in phantom) that extend in a single direction from hollow chamber 258 to exterior 251 of tube 252. A plurality of first tubes 262 are also included, with an individual first tube 262 being fluidly interconnected between an individual passage 260 and laser block assembly 210. The manifold 250 can also includes a plurality of second tubes (not shown), each one of which is interconnected between a first tube 262 and a laser block assembly 210, as may be desired.

Passages 260 of manifold 250 are formed in tube 252 extending in a single direction between hollow chamber 258 and exterior 251. The configuration of passages 260 results in a stacked array of laser block assemblies 210 on manifold 250 wherein the individual assemblies 210 are arranged transverse and adjacent to one another without significant spacing between the assemblies. Such a manifold 250 creates a densely packed array of laser block assemblies 210, which can advantageously result in reduced space requirements for the manifold at a processing station. Manifold 250 can also be configured with additional passages 260 that permit a symmetric array of laser block assemblies to be mounted to manifold 250 on an opposite side of the elongated tube 252 from which the assemblies 210 of FIG. 5 are mounted.

A manifold in accordance with the present invention provides for more efficient processing of a batch of laser block assemblies. Forming a stacked array of laser block assemblies on a manifold as described above increases the density of laser block assemblies on a vacuum processing station of a conventional processing tool. This permits more laser block assemblies to be processed at a time, which in turn reduces the overall cost per laser block assembly. In addition, a manifold having a stacked array of laser block assemblies can reduce the number of processing stations on conventional processing tools necessary in a laser block assembly processing area, which reduces the overall size of the processing tooling. For applications where partial or full vacuum is drawn, fewer processing stations also leads to fewer vacuum pumps and other related vacuum system structure, which advantageously increases overall processing efficiency.

Although the present invention has been described with reference to preferred embodiments, those skilled in the art will recognize that changes may be made in form and detail without departing from the spirit and scope of the invention.

What is claimed is:

1. A manifold in combination with a plurality of laser block assemblies for simultaneously processing the plurality of laser block assemblies, the manifold comprising:
    an elongated member that includes
        a hollow chamber extending along a portion of the elongated member,
        a fluid port extending between the hollow chamber and a first end of the elongated member, the fluid port adapted to be mated with a processing station,
        a sealed second end of the elongated member, and
        a plurality of passages extending between the exterior of the elongated member and the hollow chamber;
    wherein the plurality of laser block assemblies are fluidly connected with the hollow chamber, each one of the plurality of laser block assemblies mounted to an individual one of the plurality of passages extending between the hollow chamber and the exterior of the elongated member to permit the simultaneous processing of the plurality of laser block assemblies through the elongated member.

2. The manifold of claim 1, wherein each of the laser block assemblies are mounted to the elongated member with a seal.

3. The manifold of claim 2, wherein the seal comprises:
    a first tube fluidly connected to one of the plurality of passages of the elongated member;
    a fill tube fluidly interconnected between the first tube and one of the laser block assemblies; and
    a connector between the first tube and the fill tube.

4. The manifold of claim 3, wherein the first tube is an isolation tube formed from a non-conductive material.

5. The manifold of claim 4, wherein the first tube is formed from glass.

6. The manifold of claim 4, wherein the first tube is formed from ceramic.

7. The manifold of claim 3, wherein the connector between the first tube and the fill tube is a compression fitting that sealingly mates the first tube to the fill tube.

8. The manifold of claim 2, wherein the plurality of laser block assemblies are arranged adjacent to each other to form a stacked array, with a thickness of each of the laser block assemblies being in a plane substantially parallel to the longitudinal axis of the elongated member.

9. The manifold of claim 8, wherein the plurality of laser block assemblies are arranged adjacent and parallel to each other to form the stacked array.

10. The manifold of claim 2, wherein each of the laser block assemblies comprises:
    a laser block having an optical closed loop path; and
    at least two electrodes in fluid communication with the optical closed loop path and adapted to be connected to a source of electrical potential, one electrode including a fluid port;
    wherein the seal between the laser block assembly and one of the plurality of passages of the elongated member fluidly couples the optical closed loop path of the laser block assembly to the manifold.

11. The manifold of claim 10, wherein the seal between each of the laser block assemblies and the elongated member comprises:
    a first tube fluidly connected to one of the plurality of passages of the elongated member;
    a second tube fluidly interconnected between the first tube and one of the laser block assemblies; and
    a connector between the first tube and the second tube.

12. The manifold of claim 11, wherein the first tube is an isolation tube formed from a non-conductive material.

13. The manifold of claim 12, wherein the first tube is formed from glass.

14. The manifold of claim 12, wherein the first tube is formed from ceramic.

* * * * *